United States Patent [19]
Mansfield

[11] Patent Number: 5,351,402
[45] Date of Patent: Oct. 4, 1994

[54] HARD NUT KERNEL EXTRACTOR

[76] Inventor: Leonard L. Mansfield, 33115 County Rd. 6330, Licking, Mo. 65542-9537

[21] Appl. No.: 141,216
[22] Filed: Oct. 26, 1993
[51] Int. Cl.$^5$ ............................................. A47J 43/26
[52] U.S. Cl. ...................... 30/120.3; 30/120.5; 81/426
[58] Field of Search ................ 30/120.1, 120.2, 120.3, 30/120.4, 120.5; 81/424.5, 426, 426.5; 225/104; 452/16, 17; D7/680

[56] References Cited

U.S. PATENT DOCUMENTS

| | | | |
|---|---|---|---|
| D. 196,381 | 9/1963 | Basilotta | 452/17 X |
| 404,811 | 6/1889 | Wichelhaus | 81/426 X |
| 708,014 | 9/1902 | Blagden | 452/17 |
| 1,123,852 | 1/1915 | Costa | 30/120.3 |
| 3,401,444 | 9/1968 | Kovacs | 81/426 X |
| 4,905,350 | 3/1990 | Gardner | 30/120.4 X |
| 4,965,954 | 10/1990 | Cavazos | 81/426 X |

FOREIGN PATENT DOCUMENTS 718985  11/1966  Italy ...................... 225/104

*Primary Examiner*—Rinaldi I. Rada
*Assistant Examiner*—Clark F. Dexter

[57] ABSTRACT

A hand operated, hard nut kernel extractor device comprising: scissor action leverage handles, chipper blade, concave constructed blade seat with a spoon shaped extension to serve as a nut support and blade guard for safety; used to chip the hard shell of nuts away from the kernel to prevent kernel fragmentation.

1 Claim, 1 Drawing Sheet

HARD NUT KERNEL EXTRACTOR

BACKGROUND OF THE INVENTION

This invention relates to an improved method for removing the nut shell of very hard shell nuts of a kind that requires removal by a hand operation, away from the kernel with minimal fragmentation of the kernel. It may, however, be used with desirable results, on a variety of other nuts in the soft shell category.

As far as can be determined, in my search for methods of removing the kernel from the hard nut shell, my invention is the only one that employs a blade for this purpose. A search was made for patents of such devices in The Official Gazette of the U.S. Patent Office and it was discovered that the devices described therein are mounted to a base and operated with a lever. Other devices have similar features, but lacked the special blade feature or the spoon-shaped extension of this invention.

This blade type kernel extractor is a vast improvement over the old method of picking out the kernel with a sharp pointed object which often shattered the kernel. For example, on particularly difficult hard shell nuts such as the black walnut, the old method of prying the kernel out of the shell most often destroyed the kernel by the pressure exerted to remove it from the shell. This new method of extracting the kernel is easy, safe, fast and efficient.

My invention employs a wedge-shaped chipper blade for chipping the shell of the nut away from the kernel. This method removes the kernel with minimal fragmentation to the kernel.

Nuts such as the black walnut, hickory nuts, and other similar hard shell nuts, must be "cracked" open prior to using this invention for extracting the kernel from the hard nut shell. Certain varieties of nuts with softer shells, such as pecans or almonds, may be opened using the unique blade and blade seat features of this invention to extract the kernel without prior cracking of the shell. When the invention is operatively employed, a spoon-shaped element supports the nut or a portion thereof, and serves as a safety feature to the operator.

STATEMENT OF THE INVENTION

The tool of the invention comprises first and second opposed jaw elements pivoted together by a pin and applies the principle of a hand-squeezed plier type chipping tool to permit removal of hard nut shells away from the kernel by successive hand operations to open and close the upper and lower members. Blade and seat elements provide mechanical leverage on a nut shell therebetween.

In a preferred form of the invention, the hand operated tool is intended for removing the hard shell of nuts away from the kernel to prevent fragmentation of the kernel. A wedge-shaped blade on the upper member jaw element is relatively compact and seats in a concave recess on the lower member jaw element. As a safety feature of the invention, the lower member jaw element has a spoon-shaped element extending beyond the blade seat to support the workpiece and prevent digital injury to the operator of the invention.

DETAILED DESCRIPTION OF PREFERRED EMBODIMENT

Figure 1:
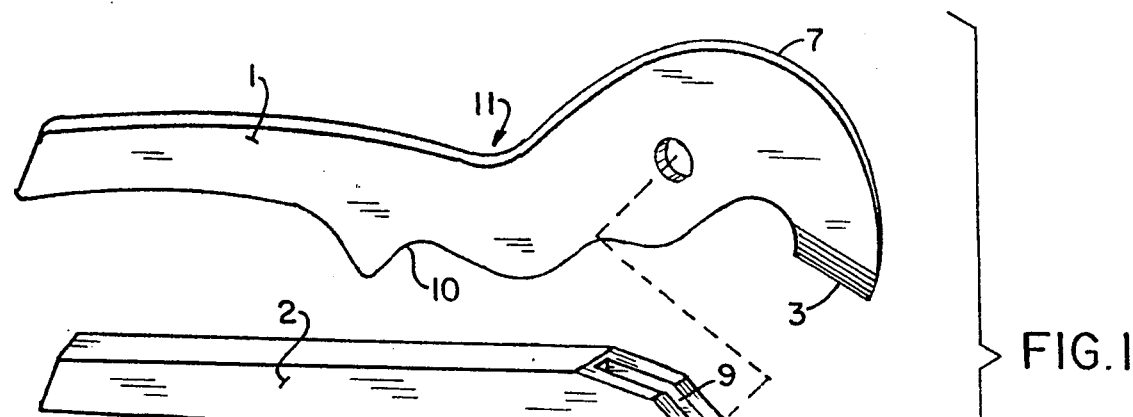
FIG. 1 is an exploded view of the invention.
Figure 3:
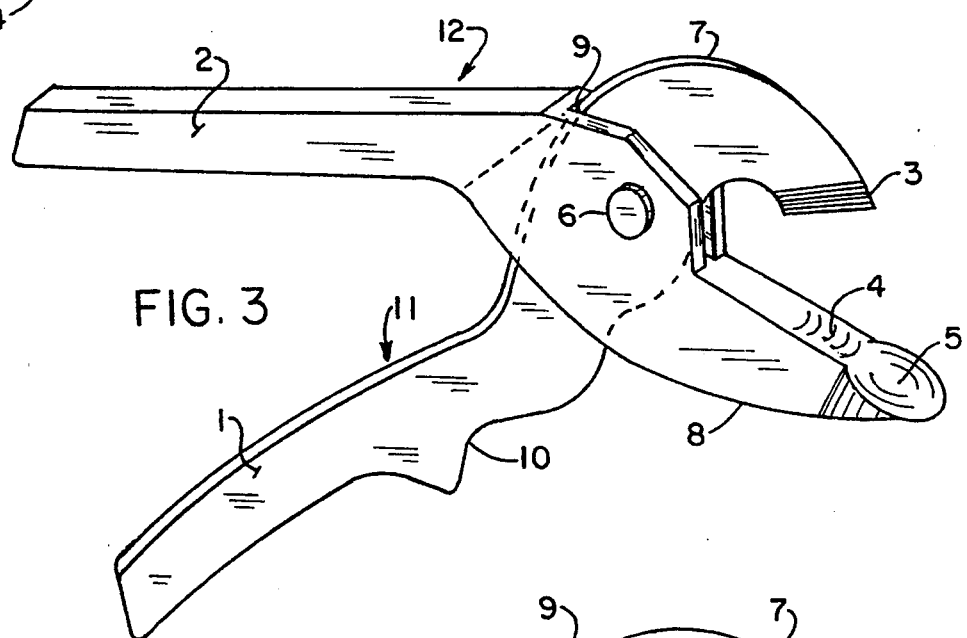
FIG. 3 is a perspective view of the invention in an open position.
Figure 4:
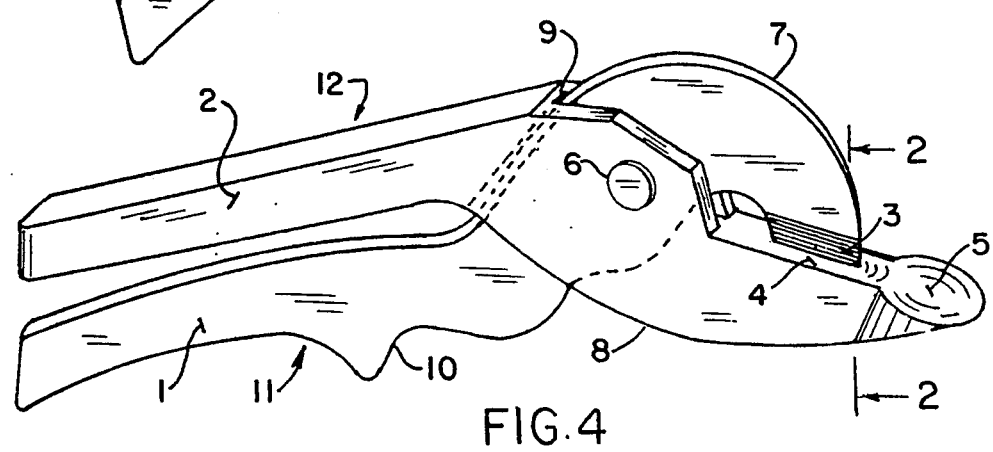
FIG. 4 is a perspective view of the invention in a closed position.

Referring to FIGS. 1, 3, and 4, the plier type Hard Nut Kernel Extractor will be termed "the invention". Referring particularly to FIG. 1, certain nomenclatures and element numbers are designated as "upper" or "lower". Accordingly, handle 1, first jaw 7, grip notch 10, and blade 3 are termed "upper member" 11. Handle 2, second jaw 8, recessed channel 9, blade seat 4, and spoon-shaped extension 5 are termed "lower member" 12.

First jaw element 7 and second jaw element 8 have opposing curved configurations. The downwardly curved first jaw element 7 is fitted in a longitudinal recessed channel 9 of the second jaw element 8. These jaw elements 7 and 8 are pivoted together by a pivot pin 6 which provides stability for the blade 3 and blade seat 4, and transfers plier type mechanical movement of the jaw elements 7 and 8 as the invention is employed.

The pivot pin 6 is sufficiently long to pass between upper member 11 and lower member 12. One end of the pivot pin has a round head so it cannot pass thru lower unit 12. When the invention is assembled FIGS. 3 and 4, the pivot pin 6 is secured by a pressed fit in lower member 12, but allows free pivotal movement of upper member 11. The free pivotal movement allows the upper member 11 to gravitate to the open position FIG. 3 as pressure is released from handles 1 and 2.

First jaw element 7 has a wedge-shaped blade 3 that exerts pressure on a workpiece as it moves to a concave blade seat 4 on second jaw element 8 as hand pressure is applied to handle elements 1 and 2. The grip notch 10 on upper member 11 enables a secure grip for the fingers and prevents slippage of the user's hand.

Figure 2:
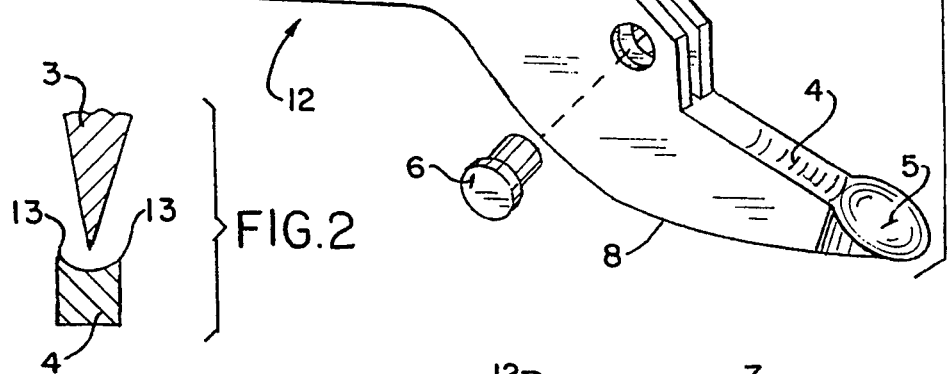
FIG. 2 is a magnified view of the blade and blade seat portion of the invention as it appears to the viewer, along the directional line II of FIG. 4.

FIG. 2 shows the wedge-shaped configuration of blade 3 and the concave configuration of blade seat 4. These unique elements of the invention create a three point pressure on the nut shell between the wedge-shaped blade 3 and the top outer edges 13 of the concave blade seat 4 when hand pressure is applied to handles 1 and 2, FIG. 1. This pressure produces a break-cut action on a nut shell just before blade 3 moves flush into the bottom of blade seat 4, FIG. 4. This break-cut action in a series of one or more successive hand operations, causes the nut shell to become separated from the kernel with minimal fragmentation to the kernel.

As with any hand held blade device, safety is an important factor. Therefore, a spoon-shaped extension 5 is rigidly extended just beyond the blade seat 4 of the second jaw 8. This extension serves a dual purpose by supporting the workpiece and serving as a guard to prevent the operator's fingers or thumb from slipping under the wedge-shaped blade 3 while the invention is operatively employed.

This invention is composed of a light material, but of sufficient strength to allow for ample leverage between the blade 3 and the blade seat 4.

I claim:

1. A hard nut kernel extracting tool comprising:

(a) first and second opposed curved jaw elements pivoted together by a pin at one end to open and close the jaw elements,
(b) a first handle element extending rigidly from the one end of the first jaw element,
(c) a second handle element extending rigidly from the one end of the second jaw element,
(d) the other end of the first jaw element having a wedge-shaped blade,
(e) the other end of the second jaw element having a concave blade seat aligned with the wedge-shaped blade for receiving the wedge-shaped blade,
(f) the other end of the second jaw element further having a spoon-shaped extension extending from the concave blade seat such that the spoon-shaped extension extends beyond the wedge-shaped blade when the wedge-shaped blade is closed against the concave blade seat,
(g) whereas upon squeezing the handles toward one another, the first jaw element and second jaw element are brought together in a plier-type movement, engaging the wedge-shaped blade and concave blade seat on a nut or portion thereof therebetween, thus creating a three point pressure against the nut shell or portion thereof and producing a break-cut action causing separation of the nut shell and kernel.

* * * * *